(12) United States Patent
Cochran et al.

(10) Patent No.: US 10,810,033 B2
(45) Date of Patent: Oct. 20, 2020

(54) PROPAGATING EXTERNAL ROUTE CHANGES INTO A CLOUD NETWORK

(71) Applicant: International Business Machines Corporation, Armonk, NY (US)

(72) Inventors: Marc Cochran, Shrewsbury, MA (US); Kevin A. Hughes, Cedar Park, TX (US); Jason G. Pearce, Round Rock, TX (US); Avinash N. Suvvari, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 55 days.

(21) Appl. No.: 15/675,471

(22) Filed: Aug. 11, 2017

(65) Prior Publication Data
US 2019/0050246 A1    Feb. 14, 2019

(51) Int. Cl.
*H04L 29/12* (2006.01)
*G06F 9/455* (2018.01)
(Continued)

(52) U.S. Cl.
CPC .......... *G06F 9/45558* (2013.01); *H04L 12/66* (2013.01); *H04L 45/586* (2013.01);
(Continued)

(58) Field of Classification Search
CPC ............ G06F 9/45558; G06F 9/54; G06F 2009/45595; H04L 12/66; H04L 45/586; H04L 61/2525; H04L 45/02; H04L 47/2441; H04L 41/0695; H04L 43/16; H04L 45/22; H04L 41/0816; H04L 43/10; H04L 45/04; H04L 45/74; H04L 12/4633;
(Continued)

(56) References Cited

U.S. PATENT DOCUMENTS 7,630,358 B1 * 12/2009 Lakhani ................ H04L 45/586
370/351
7,668,166 B1 *  2/2010 Rekhter ............. H04L 12/4645
370/392

(Continued)

OTHER PUBLICATIONS

Wiki; BGP protocol with Link-State Distribution—ONOS—Wiki, Mar. 15, 2017.
Cisco; Uses of the Overload Bit with IS-IS, Oct. 25, 2005.

*Primary Examiner* — Wutchung Chu
(74) *Attorney, Agent, or Firm* — Garg Law Firm, PLLC; Rakesh Garg; Michael O'Keefe (57) ABSTRACT

An internal route usage information from a set of internal route usage information is analyzed to determine an encoding structure used in the internal route usage information and an external route that is referenced in internal route usage information. Using the set of internal route usage information, a subset of external route change information is selected from a set of external route change information, where each changed external route represented in the subset is usable to reach a currently used destination on an external network. A first external route change information from the subset is encoded according to the encoding structure, forming a first encoded route change data. Using the first encoded route change data, an internal router in an internal network is caused to recognize a status change in a first external route.

20 Claims, 7 Drawing Sheets

(51) Int. Cl.
  *H04L 12/66* (2006.01)
  *H04L 12/713* (2013.01)
  *G06F 9/54* (2006.01)
  *H04L 12/741* (2013.01)
(52) U.S. Cl.
  CPC ............ *H04L 61/2525* (2013.01); *G06F 9/54* (2013.01); *G06F 2009/45595* (2013.01); *H04L 45/745* (2013.01)
(58) Field of Classification Search
  CPC ..... H04L 41/0813; H04L 41/12; H04L 45/64; H04L 61/103; H04L 12/4641; H04L 45/745
  See application file for complete search history.

(56) References Cited

U.S. PATENT DOCUMENTS

| | | | | |
|---|---|---|---|---|
| 8,612,576 | B1* | 12/2013 | Brandwine | H04L 43/08 709/224 |
| 8,830,834 | B2* | 9/2014 | Sharma | H04L 45/64 370/235 |
| 10,015,094 | B1* | 7/2018 | Akers | H04L 61/6068 |
| 2006/0039371 | A1* | 2/2006 | Castro | H04L 45/02 370/389 |
| 2010/0080233 | A1 | 4/2010 | Kwapniewski et al. | |
| 2014/0337500 | A1* | 11/2014 | Lee | H04L 67/10 709/223 |
| 2015/0043378 | A1* | 2/2015 | Bardgett | H04L 12/4641 370/254 |
| 2015/0163152 | A1* | 6/2015 | Li | H04L 41/5019 370/409 |
| 2015/0195196 | A1* | 7/2015 | Patel | H04L 12/4641 370/392 |
| 2015/0263888 | A1* | 9/2015 | Hallivuori | H04L 45/50 709/226 |
| 2015/0271011 | A1* | 9/2015 | Neginhal | H04L 41/0803 370/254 |
| 2015/0280998 | A1* | 10/2015 | Kitani | H04L 41/0896 370/254 |
| 2016/0112307 | A1* | 4/2016 | Shen | H04L 12/4679 370/254 |
| 2016/0119219 | A1* | 4/2016 | Fang | H04L 41/12 370/392 |
| 2016/0226759 | A1* | 8/2016 | Zhang | H04L 41/0654 |
| 2016/0352633 | A1* | 12/2016 | Kapadia | H04L 12/4633 |
| 2017/0118173 | A1* | 4/2017 | Arramreddy | H04L 63/20 |
| 2018/0006935 | A1* | 1/2018 | Mutnuru | H04L 45/42 |
| 2018/0041425 | A1* | 2/2018 | Zhang | H04W 24/08 |
| 2018/0062932 | A1* | 3/2018 | Cohn | H04L 41/12 |
| 2018/0167316 | A1* | 6/2018 | Agarwal | H04L 45/741 |

* cited by examiner

PROPAGATING EXTERNAL ROUTE CHANGES INTO A CLOUD NETWORK

TECHNICAL FIELD

The present invention relates generally to a method, system, and computer program product for managing changes in a data path through a physical network. More particularly, the present invention relates to a method, system, and computer program product for propagating external route change information into a cloud network.

BACKGROUND

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud model may include any of the at least five characteristics, which are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

A cloud model may further include any of the at least three service models, which are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud Infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

A cloud model may further include any of the at least four deployment models, which are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud environment comprises a variety of hardware, software, and firmware networking components. A physical network, also called a data plane or an underlay, is a network of physical components where actual networking operations are performed and computational workloads are executed.

Presently available techniques are used to construct a logical network, also known as a software defined network (SDN) overlay (hereinafter interchangeably, "SDN" or "overlay"), from such networking components. Essentially, networking components are abstracted into corresponding logical or virtual representations, and the abstractions are used to define the SDN. In other words, an SDN is a logical network formed and operated using logical representations of the underlying physical components.

A physical computing machine can be represented and used in an SDN as a virtual device, which is also referred to as an Edge in a Network Virtualization Environment (NVE). Physical resources, including the links from the underlay are represented by one or more virtualized entities within the overlay.

Links of a physical network of the underlay are used by workloads operating in the overlay to transmit and receive data packets. Because the overlay is a virtual environment, a virtual address space is used within the overlay, and by the workloads executing in the overlay, to reference the virtualized entities that represent the physical links and other physical resources.

SUMMARY

The illustrative embodiments provide a method, system, and computer program product. An embodiment includes a method that analyzes, from a set of internal route usage information, an internal route usage information to determine (i) an encoding structure used in the internal route usage information, and (ii) an external route that is referenced in internal route usage information. The embodiment selects, using the set of internal route usage information, from a set of external route change information, a subset of external route change information, wherein each changed external route represented in the subset is usable to reach a currently used destination on an external network. The embodiment encodes, a first external route change information from the subset according to the encoding structure, forming a first encoded route change data. The embodiment causes, using the first encoded route change data, an internal router in an internal network to recognize a status change in a first external route.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Border Gateway Protocol (BGP) is a gateway protocol implemented in physical gateways of a physical network, such as the Internet, to exchange routing and reachability information with each other and with other self-contained systems operating in or interfacing with the physical network. A physical network is also interchangeably referred to herein as an external network. A physical gateway, such as a physical router or a physical switch, or a similarly purposed other physical component is hereinafter interchangeably referred to as an external component.

A virtual gateway, such as a virtual router or a virtual switch, or a similarly purposed other virtual component is used within a virtualized cloud environment, e.g., in the overlay of the cloud. Such virtual gateways are hereinafter interchangeably referred to as internal components. An internal component facilitates data communication between virtual entities and workloads operating in the overlay, as well as data communication between such virtual entities or workloads and an external network.

Consider a virtual router as an example internal component. The virtual router implements a different protocol for facilitating the data communications described above. When the virtual router has to send a data packet to a route through the external network, the virtual router uses routing information that references a virtual entity, where the virtual entity represents the route or a component usable to access the route.

The illustrative embodiments recognize that presently, because the differences in the protocols implemented in internal and external components, and because of the differences in the manners of implementation and/or operation of the internal and external components, making the internal network aware of route changes in an external network is a difficult task. This task is not performable manually because changes can occur in multiple routes simultaneously and the state of a link in a route can change significantly faster than a human can observe the change and make a decision.

When an external component, such as a BGP router detects a change in a state of a route in a BGP compliant external network, the external router produces route change information according to BGP. Presently, custom code has to be written and managed to call proprietary application program interfaces (APIs) to make an internal network aware of the route changes in an external network, i.e., to propagate the BGP route change information into the internal network. Presently, the internal networks implement the APIs in a custom manner for finding out the external network conditions, necessitating non-replicable interfacing custom code to such proprietary APIs for processing and communicating the BGP route change information. The illustrative embodiments recognize that many internal networks include millions of virtual entities and thousands of internal components channeling data to and from external networks. Furthermore, more than one external networks may be utilized in this manner, each comprising limitless number of routes, links, and external components.

The illustrative embodiments recognize that the size of networks, number of components involved, numerosity of the routes, and the speed of the route changes make propagating BGP route change information into cloud networks a very difficult problem. The illustrative embodiments recognize that attempting to solve this problem through a manual process is futile, and solving the problem with custom code is undesirable. The custom API code is generally environment-specific, requiring frequent changes to stay in-step with the changes in the environment, requiring skilled and knowledgeable staff to manage the code. The custom API code-based solutions are therefore expensive, non-standard, non-reusable, and error-prone.

A standards-based replicable solution is needed for making an internal network aware of external route changes. The illustrative embodiments recognize that the presently available tools or solutions do not address these needs or provide adequate solutions for these needs. The illustrative embodiments used to describe the invention generally address and solve the above-described problems and other problems related to propagating external route change information into a cloud network.

An embodiment can be implemented as a software application. The application implementing an embodiment can be configured as a modification of an existing internal component—such as a virtual router or virtual switch, as a modification of an existing external component—such as a physical router or physical switch, as a separate application that operates in conjunction with one or more internal and/or external components, a standalone application, or some combination thereof.

An illustrative embodiment configures a bridge component. The bridging router interfaces with an internal component and an external component. In one embodiment, the bridging router is a virtual component, such as a virtual router or a virtual switch operating in an overlay, in a manner similar to the internal router. In another embodiment, the bridging router is a physical component, such as a physical router or a physical switch operating in an underlay.

The external router, with which the bridging router interfaces, is a BGP-compliant device which is enabled to provide BGP route change information about the state changes of routes through an external network. The external router either operates in the underlay of the given cloud environment or interfaces with a physical component in the underlay.

The internal router, with which the bridging router interfaces, operates in an overlay. The internal router utilizes a set of virtual entities corresponding to a set of BGP routes through an external network.

An application comprising software code according to an embodiment executes in or as a part of the bridging router. The embodiment receives BGP route change information from the external router. The embodiment receives internal route usage information from one or more internal routers operating in the internal network. The internal route usage information comprises route data organized in any suitable manner, including but not limited to structures specific to certain protocols or proprietary structures. The route data is sufficient to determine the structure utilized by the internal routers for maintaining and using the route data.

The route data is sufficient to determine or identify an external route member that is used by at least one entity or component in the internal network. An external route member is a component or link in an external route.

An embodiment analyzes the internal route usage information to identify from the set of BGP route change information that subset of external routes which are used from within the internal network. The embodiment selects such the subset of BGP route change information.

The embodiment encodes each BGP route change information from the subset into the structure used by the route data in the internal route usage information. For example, suppose the state of an external route has changed from inactive to active. Accordingly, an embodiment encodes the availability of the newly activated route in the form of the route data such that the encoded data of the newly activated route can be added to the available routes information of one or more internal routers.

As a part of the encoding, an embodiment further causes an instantiation of a virtual entity in the internal network such that the newly activated route is represented by the virtual entity. The instantiation of the new virtual entity can be caused in any suitable manner including but not limited to instructing a controller or another component that is operating in the overlay to create the instance in the overlay.

As another example, suppose the state of an external route has changed from active to inactive. Accordingly, an embodiment encodes the unavailability of the newly deactivated route in the form of the route data such that the encoded data of the newly deactivated route can be removed from the available routes information of one or more internal routers.

As a part of the encoding, an embodiment further causes the destruction or termination of an instance of a virtual entity in the internal network such that the deactivated route is not represented by any virtual entity. The destruction of the virtual entity can be caused in any suitable manner including but not limited to instructing a controller or another component that is operating in the overlay to terminate the instance in the overlay.

An embodiment transmits the encoded route data for addition or deletion to an internal router with which bridging router is in communication. When virtual entities corresponding to the BGP routes have to be crated or terminated in a manner described herein, such instructions or commands are also transmitted from the bridging router to suitable targets within the internal network by an embodiment.

Thus, the illustrative embodiments propagate the state information about a route in an external network to an internal network without requiring custom code or manual processes. Operations described with respect to BGP routes are not intended to be limited to routes conforming to BGP only. From this disclosure, those of ordinary skill in the art will be able to adapt an embodiment to propagate state information about external routes that conform to other protocols and such adaptations are contemplated within the scope of the illustrative embodiments.

These example manners of propagating the state of BGP routes to an internal network are not intended to be limiting on the illustrative embodiments. From this disclosure, those of ordinary skill in the art will be able to conceive many other ways of instantiating a virtual entity for the newly activated BGP route or destroying an existing virtual entity corresponding to a deactivated BGP route, and the same are contemplated within the scope of the illustrative embodiments.

The manner of propagating external route change information into a cloud network described herein is unavailable in the presently available methods. A method of an embodiment described herein, when implemented to execute on a component, device, or data processing system, comprises substantial advancement of the functionality of that component, device, or data processing system in efficiently propagating external link state information to virtualized overlay networks.

The illustrative embodiments are described with respect to certain types of routes, networks, protocols, components, information data, structures, entities, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
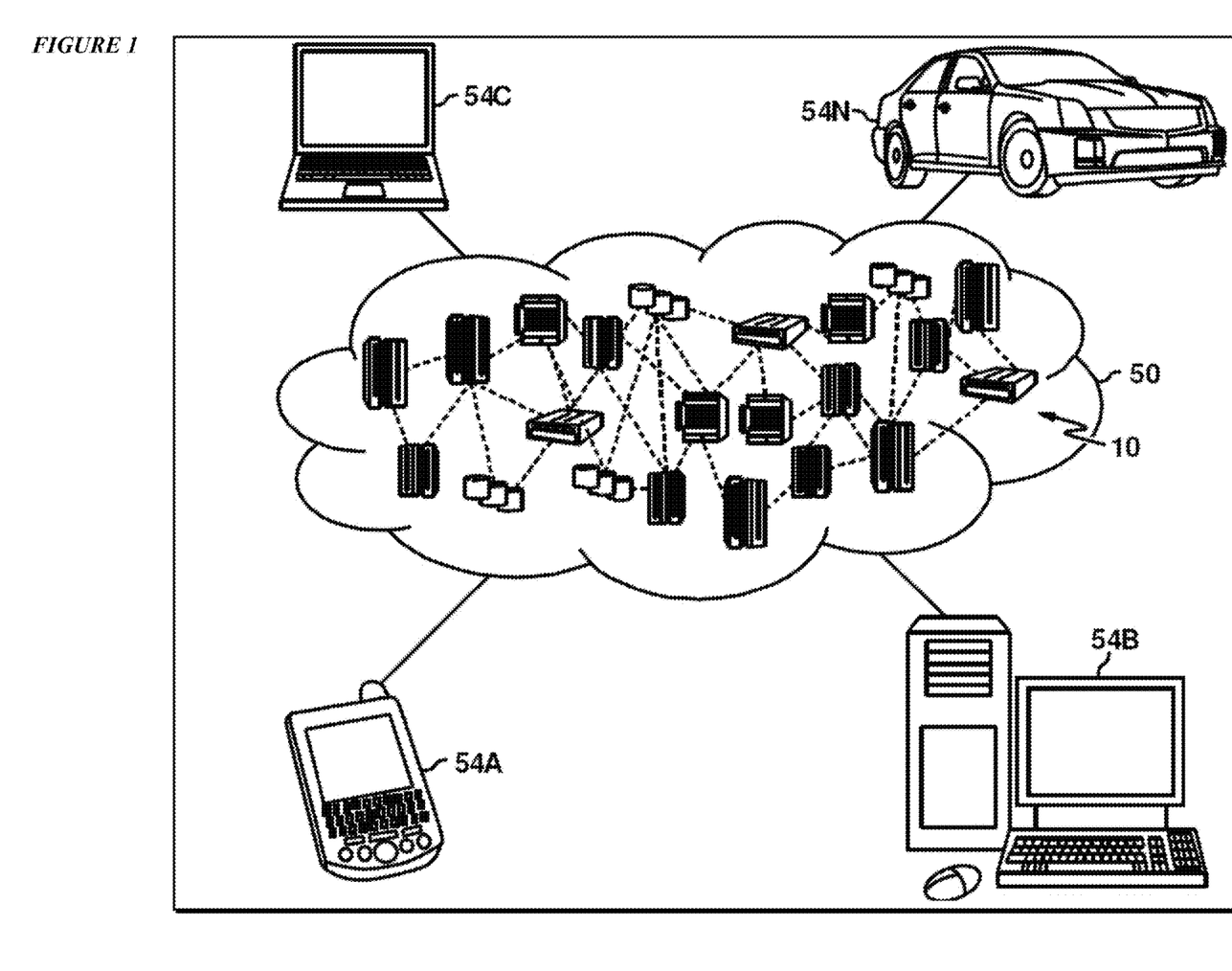
FIG. 1 depicts a block diagram of a data processing environment in which illustrative embodiments may be implemented.
Figure 2:
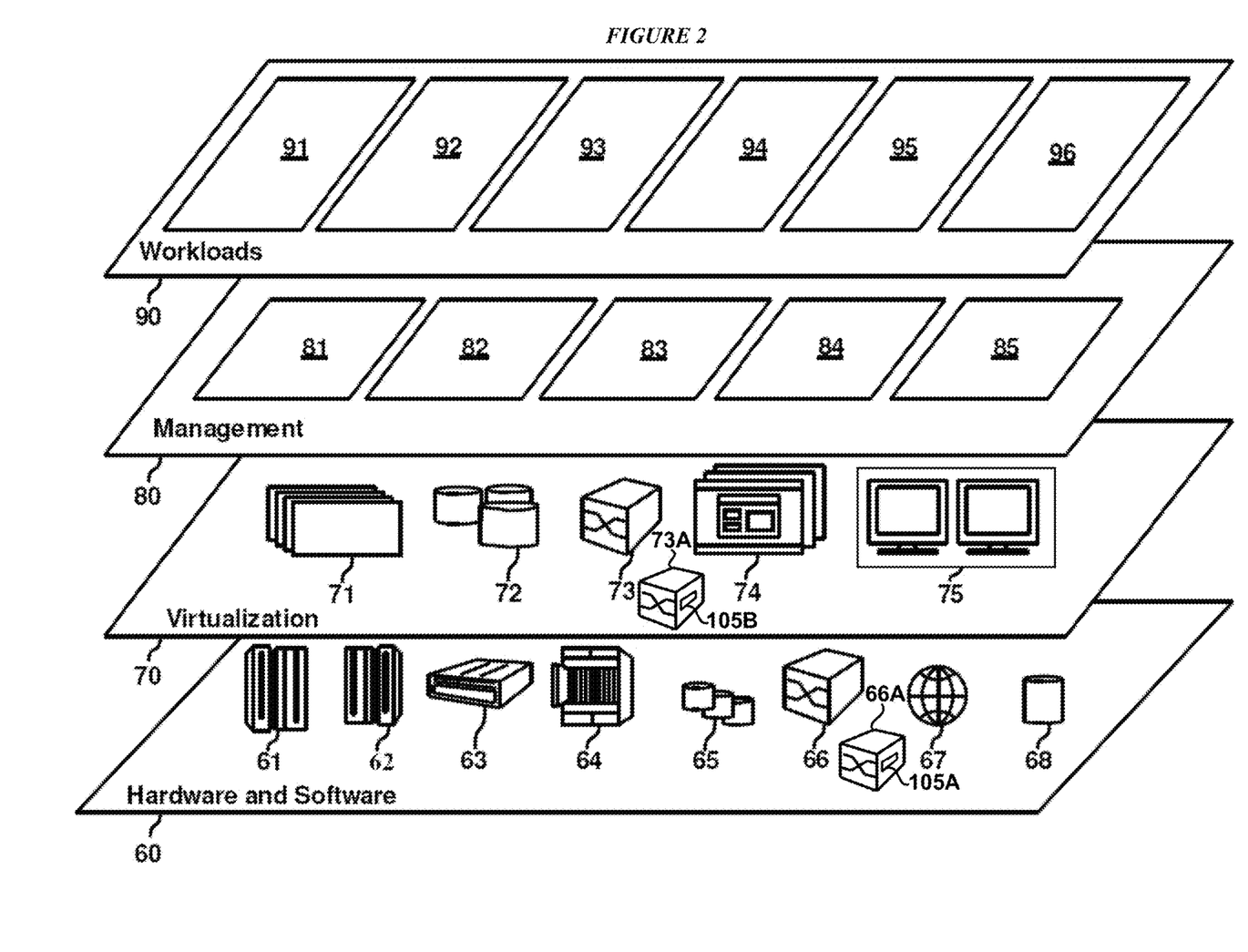
FIG. 2 depicts a block diagram of a cloud environment in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. In accordance with some embodiments of the present disclosure, nodes 10 can be physically interconnected by a plurality of fabric controllers to generate a fabric attached architecture. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

With reference to FIG. 2, this figure depicts an example set of functional abstraction layers provided by cloud computing environment 50 of FIG. 1 using which an illustrative embodiment can be implemented. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, hardware and software layer 60 further includes a plurality of fabric controllers interfacing with and controlling respective portions of hardware and software layer 60.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Application 105A, or 105B, or both 105A and 105B Implement an embodiment described herein. Application 105A operates in a device or component in the underlay, e.g., in networking component 66A in layer 60. Application 105B operates in a device or component in the overlay, e.g., in networking component 73A in layer 70.

Figure 3:
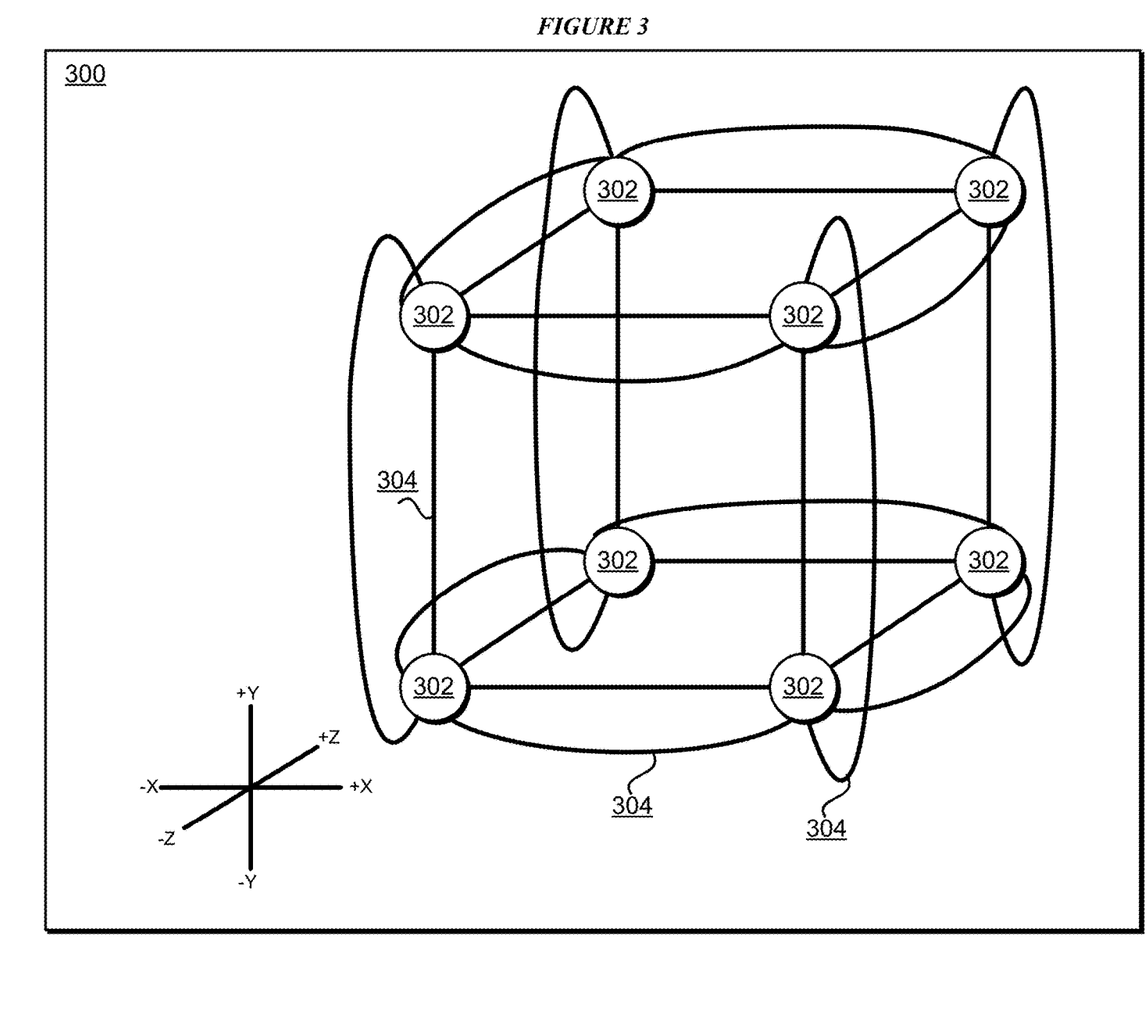
FIG. 3 depicts a block diagram of a non-limiting example network topology for implementing an illustrative embodiment.

With reference to FIG. 3, this figure depicts a block diagram of a non-limiting example network topology for implementing an illustrative embodiment. Network topology 300 is an example of a 3D torus network or fabric which can be used for an underlay, and on which an overlay virtualization can be constructed and operated in accordance with one or more embodiments of the present disclosure.

In the example shown in FIG. 3, the topology is represented as a 3-dimensional lattice, with each circle representing a cabled node (302). Nodes 302 may include, but are not limited to, server computers, storage systems, management entities, other computer systems, or any combination thereof. In some embodiments, the nodes 302 comprise different resources (e.g., compute resources, storage resources, networking resources, etc.), different families of similar products (e.g., different brands of storage resources), and/or different generations of one product (e.g., legacy systems) that are presented to a fabric attached architecture according to a fabric protocol.

The lines connecting nodes 302 represent cables 304 between the cabled nodes 302. In some embodiments, cables 304 may be optical fiber cables, Ethernet connections, or wireless channels. In some embodiments, cables 304 can be configured to accommodate alternative connections such as, but not limited to, Fibre Channel connections, Asynchronous Transfer Mode connections, and/or InfiniBand connections.

As can be seen in FIG. 3, in some embodiments, each node 302 is connected to six adjacent nodes in a torus structure via six cables 304. In some embodiments, network topology 300 can be arranged in alternative configurations that could utilize cables 304 rated for higher or lower data transfer rates than previously described based on the alternative conceptual configuration of the fabric attached architecture.

Although network topology 300 is shown as a torus structure, the fabric can also be configured in numerous alternative arrangements such as, but not limited to, a diagonal mesh (e.g., a three-dimensional diagonal mesh) or a multi-link mesh (MLM) (e.g., a three-dimensional MLM).

As can be seen in FIG. 3, the distributed computing system may be arranged using a 3D torus topology. It is to be understood in advance that the 3-D torus topology shown in FIG. 3 is a visual representation of the topology and communicative connections between nodes, and is not intended to show the actual physical arrangement of nodes (e.g., on a board or within a rack) and/or cables. Accordingly, the cables between nodes do not necessarily represent actual cables (e.g., physical cables that are connected to each node), but rather represent a communicative connection between nodes. As such, the present disclosure should not be limited to the arrangement of nodes and/or cables shown in FIG. 3.

Within the topology, each node 302 has six cables 304, one for each of the positive X, Y, and Z directions, and one for each of the negative X, Y, and Z directions. Outer-most cabled nodes 302, such as nodes located on edges of the network topology 300, will have one or more "wrap-around" cables 304 that connect the node to nodes on the opposite side of the network topology 300. For example, a node 302 that sits at the end of the network topology 300 in the +X direction will have a wrap-around cable 304 that connects it to a node that sits at the end of the network topology 300 in the −X direction. Likewise, corner nodes 302 will have three wrap-around cables 304, one for each of the X, Y, and Z directions.

While the network topology 300 in FIG. 3 is shown with eight nodes 302 arranged in a 2×2×2 arrangement, any number of nodes otherwise consistent with this disclosure is contemplated. In some embodiments, the network topology 300 may include more nodes (e.g., at least 5,000 nodes or at least 16,000 nodes), and the nodes may be arranged with unbalanced directionality. In other words, the nodes may be arranged as an N×N×N (e.g., cubic) 3D torus fabric, where the number of nodes in each direction is identical as shown in the example in FIG. 3. In other embodiments, the nodes may be arranged in a 3D torus fabric where the number of nodes in a particular direction differs from the number of nodes in a different direction (e.g., a 22×24×10 fabric).

While the network topology 300 shows a 3D torus fabric having a plurality of nodes 302 physically connected to each other such that each node 302 has 6 direct connections (e.g., cables 304) to neighboring nodes 302, as will be understood by a person of ordinary skill in the art, embodiments of the present disclosure may not have any nodes directly connected to each other. Instead, various embodiments of the present disclosure may include one or more shuffle boxes that are directly connected to the nodes (e.g., using pigtails) and to other shuffle boxes. Shuffle boxes may be connected such that the nodes are arranged in a 3D torus configuration.

Figure 4:
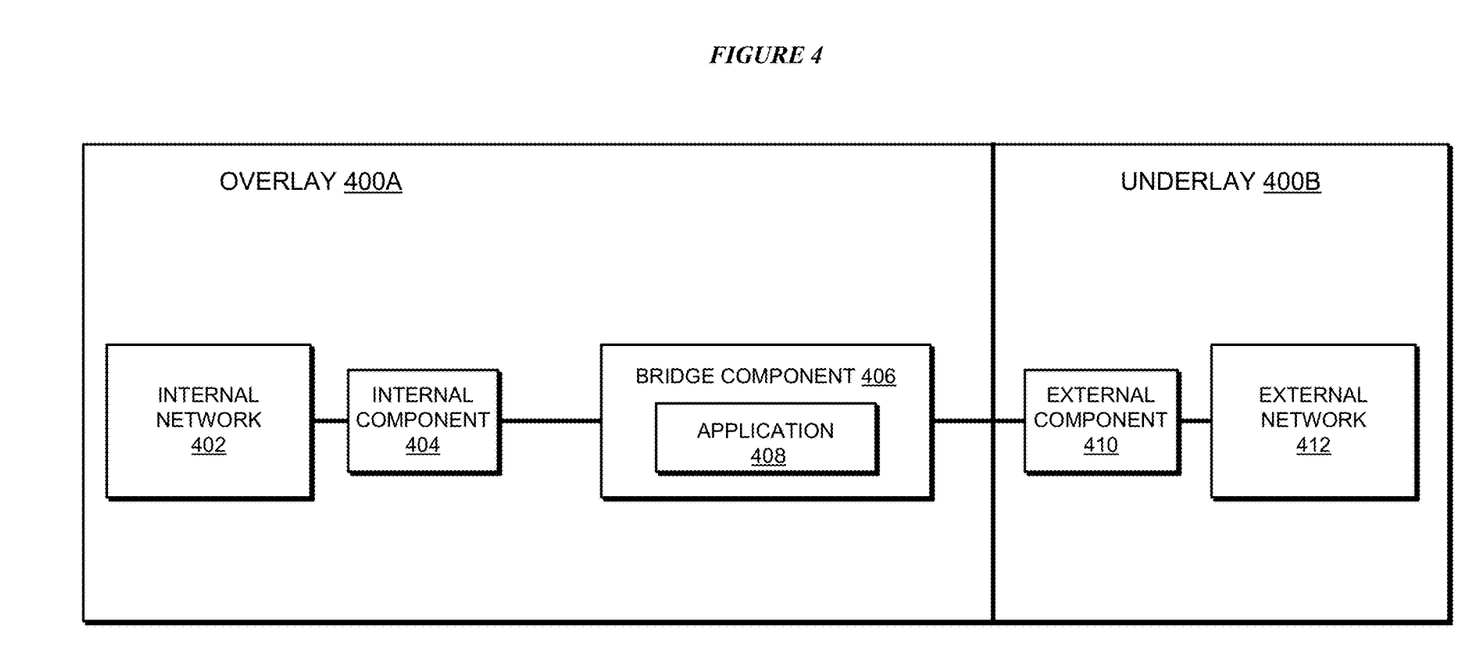
FIG. 4 depicts a block diagram of a conceptual configuration for propagating external route change information into a cloud network in accordance with an illustrative embodiment.

With reference to FIG. 4, this figure depicts a block diagram of a conceptual configuration for propagating external route change information into a cloud network in accordance with an illustrative embodiment. Overlay 400A is an example of layer 70 in FIG. 2. Underlay 400B is an example of layer 60 in FIG. 2.

Overlay 400A and underlay 400B can be, but need not necessarily be, implemented using network topology 300 in FIG. 3. For example, internal network 402 may be all or a part of an SDN operating over the 3D torus topology 300. Internal component 404 may be a virtual networking component, e.g., a Quagga router, operating in the SDN. External component 410 may be a physical networking component, e.g., a BGP-compliant physical router or switch in topology 300, which interfaces with external network 412.

Bridge component 406 can be configured in overlay 400A or underlay 400B, or a combination thereof. Preferably, in one embodiment, bridging router 406 is also a virtual networking component, e.g., another Quagga router, that is operating in the virtualized environment running over topology 300. Bridging router 406 implements application 408, which is an example of application 105A or 105B depending upon where bridging router 406 is configured.

Figure 5:
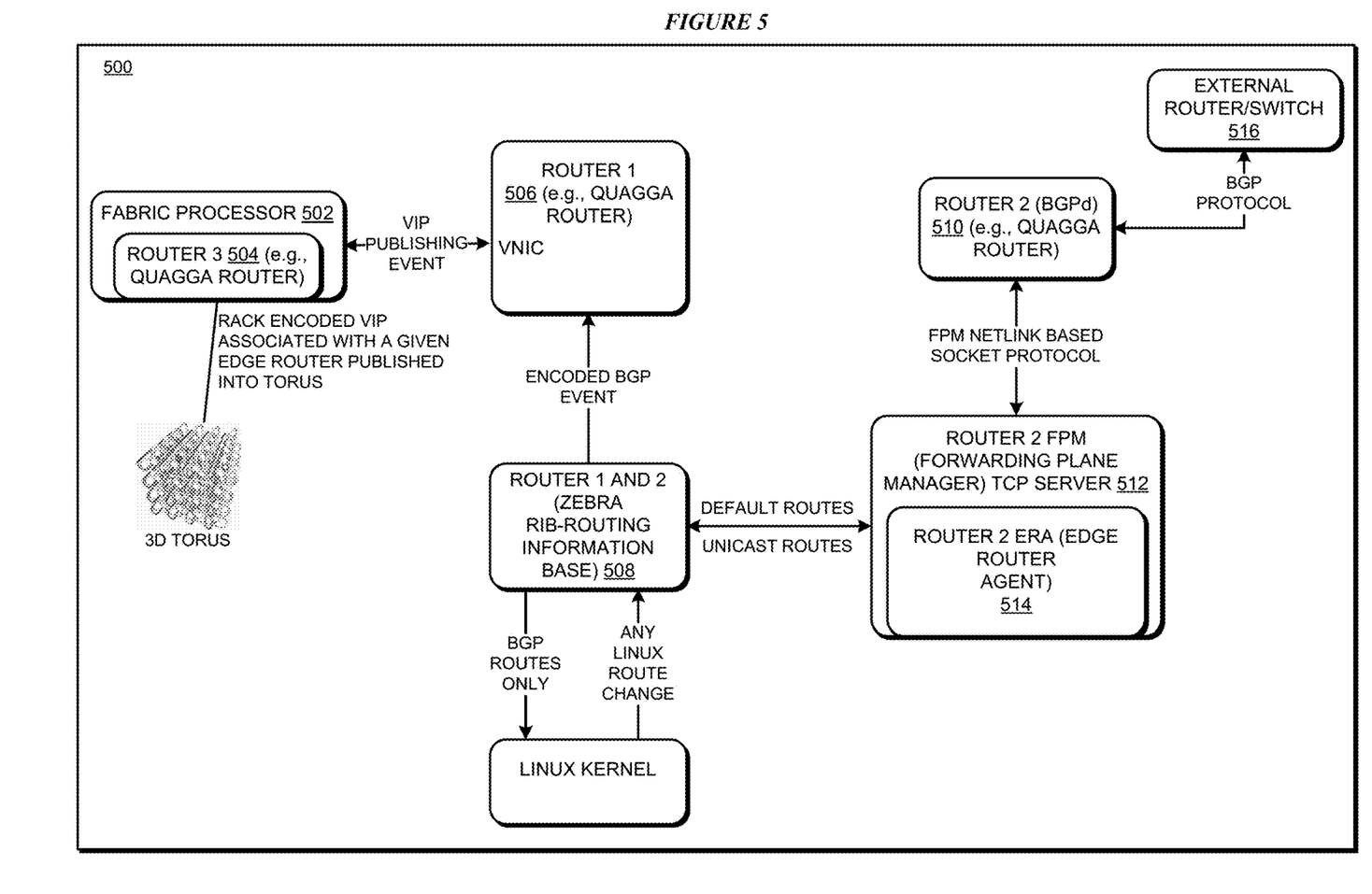
FIG. 5 depicts a block diagram of an example operation for propagating external route change information into a cloud network in accordance with an illustrative embodiment.

With reference to FIG. 5, this figure depicts a block diagram of an example operation for propagating external route change information into a cloud network in accordance with an illustrative embodiment. Fabric processor 502 is a virtual processor in a virtual network, e.g., in overlay 400A. Quagga router 3 (504) is a non-limiting example of an internal router operating in the virtualized environment. Quagga router 1 (506) is a non-limiting example of an internal router—such as internal router 404—that interfaces with a bridging router as described herein.

Block 508 depicts the information shared between internal router 506 and bridging router 510. Subcomponent 512 of bridging router 510 implements application 408 in the form of edge router agent 514. External router 516 is an example of external router 410.

External router 516 provides BGP route change information to bridging router 510. Agent 514 collects internal route usage information from information base 508, which is populated by one or more internal routers. Agent 514 provides to internal router 506 encoded BGP event, i.e., the encoded route data corresponding to useful routes that have BGP route change information associated therewith. Internal router 506 publishes the encoded route data within the internal network for consumption and route adjustments by other internal routers, such as by internal router 504. Fabric processor 502 or another component in the overlay may receive the instructions to instantiate or terminate virtual entities corresponding to the changing BGP routes, as described herein.

Figure 6:
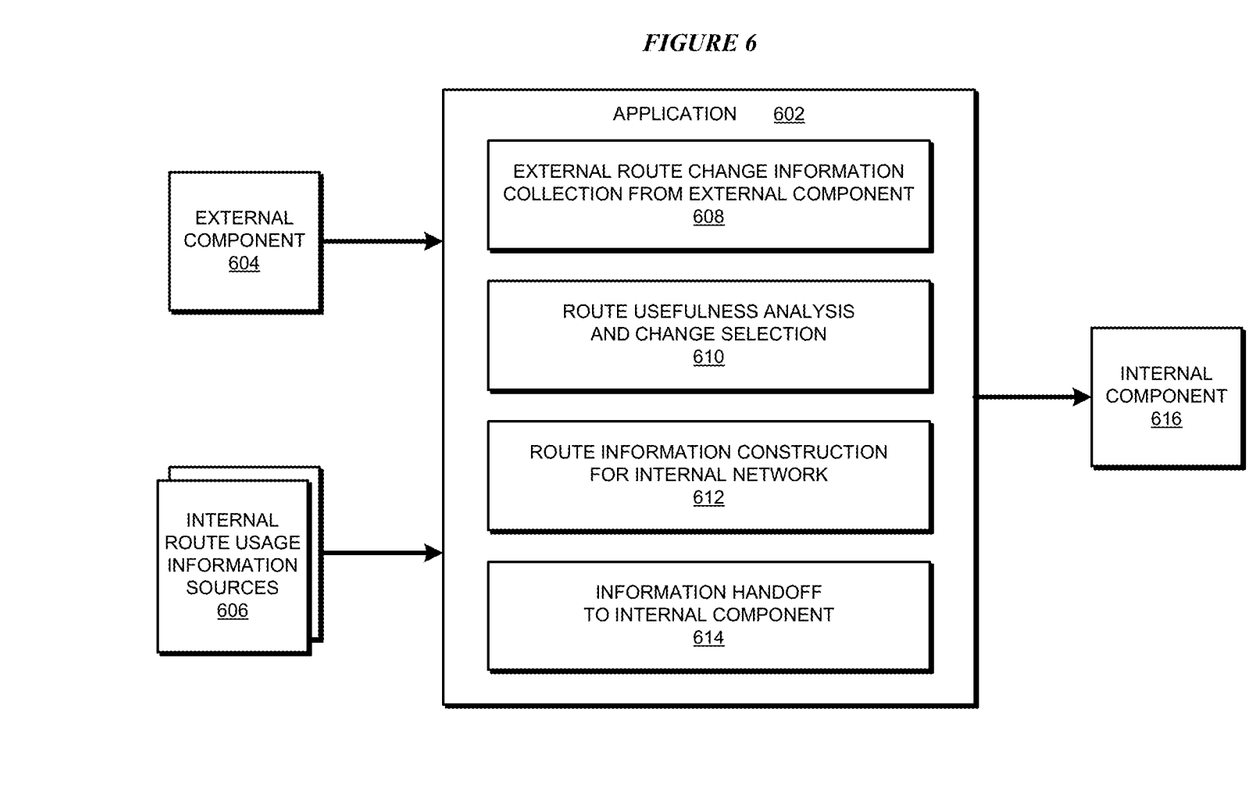
FIG. 6 depicts a block diagram of an application for propagating external route change information into a cloud network in accordance with an illustrative embodiment.

With reference to FIG. 6, this figure depicts a block diagram of an application for propagating external route change information into a cloud network in accordance with an illustrative embodiment. Application 602 can be implemented as agent 514 in FIG. 5 or application 408 in FIG. 4.

External router 604 provides external route change information, as described herein. One or more sources 606, e.g., information base 508, provide internal route usage information, as described herein. Module 608 receives or collects the external route change information and the internal route usage information from their respective sources. Module 610 analyzes the collected information to determine (i) which of the changed external routes are actually used (e.g. to a used destination) from the internal network, and (ii) how the internal route usage information is represented or structured.

Module 612 selects the subset of external route change information that is useful (i.e., used) from within the internal network. Module 612 encodes each useful external route change information into corresponding route data according to the determined structure. Module 614 sends, transmits, or otherwise hands off the encoded route data of the route change to internal router 616.

Optionally, in some implementations, for a useful external route change, module 612 also encodes an instruction to instantiate or terminate a virtual entity within the internal network depending on the state being communicated of the external route. When such instructions are encoded, module 614 sends, transmits, or otherwise hands off the instruction to an appropriate entity in the internal network.

Figure 7:
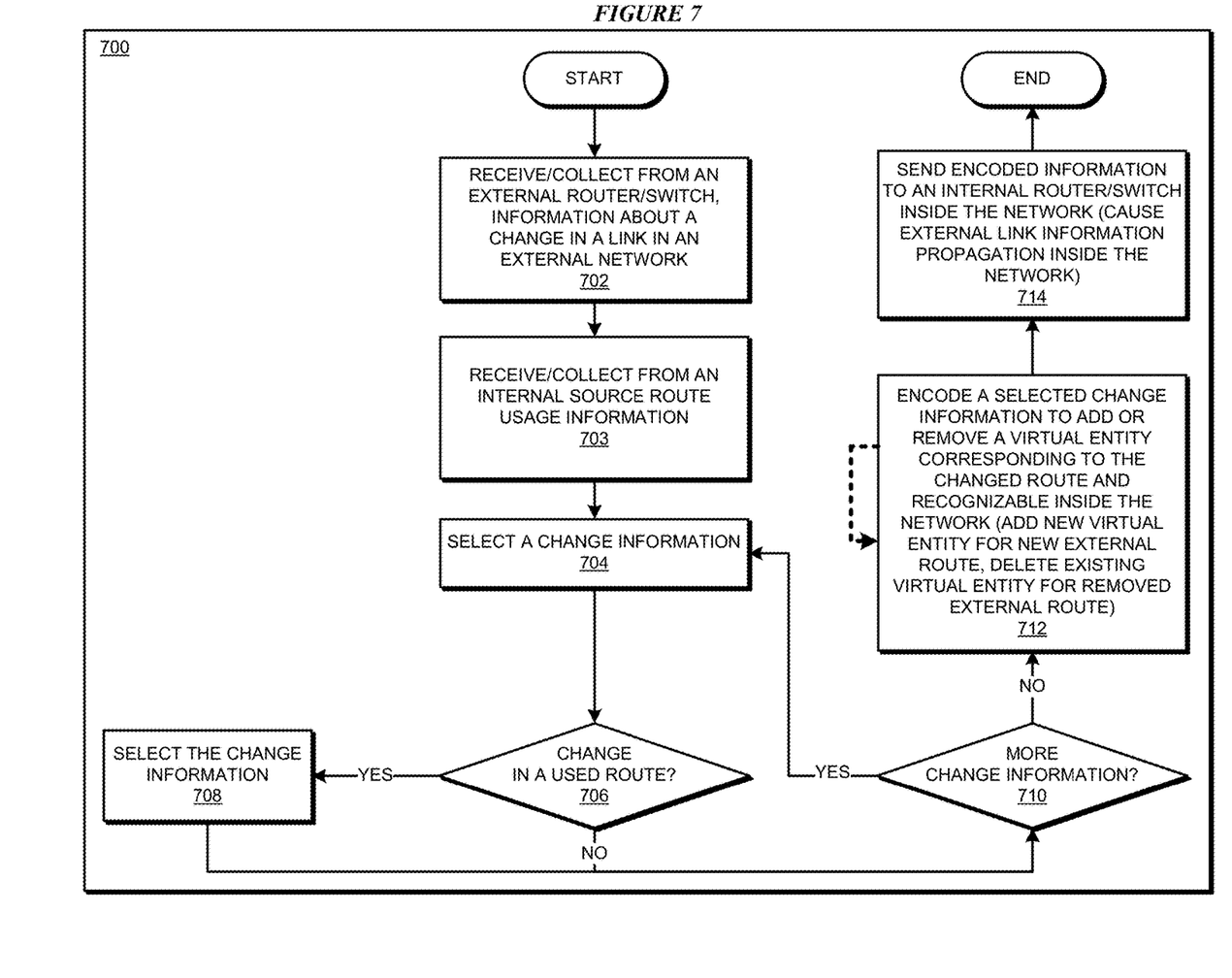
FIG. 7 depicts a flowchart of an example process for propagating external route change information into a cloud network in accordance with an illustrative embodiment.

With reference to FIG. 7, this figure depicts a flowchart of an example process for propagating external route change information into a cloud network in accordance with an illustrative embodiment. Process 700 can be implemented in application 602 of FIG. 6.

The application receives or collects from an external router external route change information (block 702). The application receives or collects from an internal source internal route usage information (block 703).

The application selects an external route change information (block 704). The application determines whether the change is in a useful external route (block 706). If the change is in a useful route ("Yes" path of block 706), the application selects the change information of that route (block 708). If the change is not in a useful route ("No" path of block 706), the application determines whether more external route change information is available (block 710).

If more external route change information is available ("Yes" path of block 710), the application returns to block 704. If no more external route change information is available ("No" path of block 710), the application encodes a selected route change information for consumption inside the internal network, as described herein (block 712). The application repeats block 712 for encoding as many external route changes as may have been selected. The application sends the encoded route change information to an internal router for propagation inside the internal network (block 714). The application ends process 700 thereafter.

Thus, a computer implemented method, system or apparatus, and computer program product are provided in the illustrative embodiments for propagating external route change information into a cloud network and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    analyzing, from a set of internal route usage information received at a bridging router from an internal router in an internal network, an internal route usage information to determine (i) an encoding structure used by the internal router in the internal route usage information, and (ii) an external route that is referenced in internal route usage information;
    selecting, using the set of internal route usage information, from a set of external route change information, a subset of external route change information received at the bridging router from an external router in an external network according to Border Gateway Protocol (BGP), wherein each changed external route represented in the subset is usable to reach a currently used destination on the external network;
    encoding, a first BGP external route change information from the subset according to the encoding structure used by the internal router, forming a first encoded route change data, the first external route change data comprising an encoded instruction to the internal router to instantiate, within a data structure of the internal router a virtual entity to represent a newly activated first external route in the first external route change information; and
    causing, using the first encoded route change data, the internal router to recognize a status change in a first external route, the recognizing comprising causing, using the encoded instruction, the internal router to instantiate the virtual entity, the virtual entity representing the newly activated first external route the first encoded route change data transmitted from the bridging router to the internal router.

2. The method of claim 1, wherein at least one component in the internal network is expected to send a data packet to the currently used destination.

3. The method of claim 1, wherein the internal route usage information comprises a routing table entry in an internal networking component, and wherein the internal router is a virtual router.

4. The method of claim 1, wherein the internal network operates in the virtual overlay environment that is virtualized from the physical underlay environment, and wherein the external network interfaces with a physical component of the physical underlay environment.

5. The method of claim 1, further comprising:
    encoding an instruction, wherein the instruction causes a virtual component of the internal network to instantiate a virtual entity to represent a newly activated first external route in the first external route change information.

6. The method of claim 1, further comprising:
encoding an instruction, wherein the instruction causes a virtual component of the internal network to terminate a virtual entity which represents a newly deactivated second external route in a second external route change information in the subset.

7. The method of claim 1, further comprising:
performing the analyzing in a bridging router, wherein the bridging router operates in the internal network, wherein the bridging router communicates with an internal router in the internal network and an external router in the external network.

8. The method of claim 1, further comprising:
collecting the set of external route change information from the external router component, wherein the external router comprises a physical networking component operating in a physical network, and wherein the external router produces the set of external route change information according to Border Gateway Protocol (BGP).

9. The method of claim 1, further comprising:
collecting the internal route usage information from a set of internal routers operating in the internal network.

10. A computer usable program product comprising one or more computer-readable storage devices, and program instructions stored on at least one of the one or more storage devices, the stored program instructions when executed by a processor causing operations comprising:
analyzing, from a set of internal route usage information received at a bridging router from an internal router in an internal network, an internal route usage information to determine (i) an encoding structure used by the internal router in the internal route usage information, and (ii) an external route that is referenced in internal route usage information;
selecting, using the set of internal route usage information, from a set of external route change information, a subset of external route change information received at the bridging router from an external router in an external network according to Border Gateway Protocol (BGP), wherein each changed external route represented in the subset is usable to reach a currently used destination on the external network;
encoding, a first BGP external route change information from the subset according to the encoding structure used by the internal router, forming a first encoded route change data, the first external route change data comprising an encoded instruction to the internal router to instantiate, within a data structure of the internal router a virtual entity to represent a newly activated first external route in the first external route change information; and
causing, using the first encoded route change data, the internal router to recognize a status change in a first external route, the recognizing comprising causing, using the encoded instruction, the internal router to instantiate the virtual entity, the virtual entity representing the newly activated first external route the first encoded route change data transmitted from the bridging router to the internal router.

11. The computer usable program product of claim 10, wherein at least one component in the internal network is expected to send a data packet to the currently used destination.

12. The computer usable program product of claim 10, wherein the internal route usage information comprises a routing table entry in an internal networking component, and wherein the internal router is a virtual router.

13. The computer usable program product of claim 10, wherein the internal network operates in the virtual overlay environment that is virtualized from the physical underlay environment, and wherein the external network interfaces with a physical component of the physical underlay environment.

14. The computer usable program product of claim 10, further comprising:
program instructions to encode an instruction, wherein the instruction causes a virtual component of the internal network to instantiate a virtual entity to represent a newly activated first external route in the first external route change information.

15. The computer usable program product of claim 10, further comprising:
encoding an instruction, wherein the instruction causes a virtual component of the internal network to terminate a virtual entity which represents a newly deactivated second external route in a second external route change information in the subset.

16. The computer usable program product of claim 10, further comprising:
performing the analyzing in a bridging router, wherein the bridging router operates in the internal network, wherein the bridging router communicates with an internal router in the internal network and an external router in the external network.

17. The computer usable program product of claim 10, further comprising:
collecting the set of external route change information from the external router, wherein the external router comprises a physical networking component operating in a physical network, and wherein the external router produces the set of external route change information according to Border Gateway Protocol (BGP).

18. The computer usable program product of claim 10, wherein the computer usable code is stored in a computer readable storage device in a data processing system, and wherein the computer usable code is transferred over a network from a remote data processing system.

19. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to analyze, from a set of internal route usage information received at a bridging router from an internal router in an internal network, an internal route usage information to determine (i) an encoding structure used by the internal router in the internal route usage information, and (ii) an external route that is referenced in internal route usage information;

program instructions to select, using the set of internal route usage information, from a set of external route change information, a subset of external route change information received at the bridging router from an external router in an external network according to Border Gateway Protocol (BGP), wherein each changed external route represented in the subset is usable to reach a currently used destination on the external network;

program instructions to encode, a first BGP external route change information from the subset according to the encoding structure used by the internal router, forming a first encoded route change data, the first external route change data comprising an encoded instruction to the internal router to instantiate, within a data structure of the internal router a virtual entity to represent a newly activated first external route in the first external route change information; and program instructions to cause, using the first encoded route change data, the internal router to recognize a status change in a first external route, the recognizing comprising causing, using the encoded instruction, the internal router to instantiate the virtual entity, the virtual entity representing the newly activated first external route the first encoded route change data transmitted from the bridging router to the internal router.

* * * * *